US008739412B2

(12) United States Patent
Gioia

(10) Patent No.: US 8,739,412 B2
(45) Date of Patent: Jun. 3, 2014

(54) UTILITY KNIFE BLADE

(76) Inventor: Constantine M. Gioia, Sumter, SC (US)

(*) Notice: Subject to any disclaimer, the term of this patent is extended or adjusted under 35 U.S.C. 154(b) by 1359 days.

(21) Appl. No.: 12/081,923

(22) Filed: Apr. 23, 2008

(65) Prior Publication Data
US 2008/0295344 A1 Dec. 4, 2008

Related U.S. Application Data

(60) Provisional application No. 60/924,733, filed on May 30, 2007.

(51) Int. Cl.
B26B 5/00 (2006.01)
B26B 9/00 (2006.01)
B26B 11/00 (2006.01)
B26B 21/56 (2006.01)
B26B 29/06 (2006.01)
G01B 3/10 (2006.01)

(52) U.S. Cl.
USPC ............ 30/123; 30/162; 30/293; 30/294; 30/317; 30/346; 30/346.61; 30/351; 7/163; 33/760

(58) Field of Classification Search
USPC ......... 30/162, 351, 346.61, 2, 90.4, 123, 282, 30/286, 289, 293, 294, 317, 346, 353; 7/163, 164; 33/760, 770
See application file for complete search history.

(56) References Cited

U.S. PATENT DOCUMENTS

| 1,748,638 | A | * | 2/1930 | Crum | 30/162 |
| 1,823,808 | A | * | 9/1931 | Thompson | 30/71 |
| 2,003,761 | A | * | 6/1935 | Testi | 30/346.56 |
| 2,041,778 | A | * | 5/1936 | Peters | 30/346.56 |
| 2,126,080 | A | * | 8/1938 | Backer | 30/353 |
| 2,359,198 | A | * | 9/1944 | Bowers | 30/32 |
| 2,952,025 | A | | 9/1960 | Johnson | |
| 3,007,244 | A | * | 11/1961 | De Vern Austin | 30/162 |
| 3,171,201 | A | * | 3/1965 | Carifi | 30/335 |
| 3,363,315 | A | * | 1/1968 | Anderson | 30/152 |
| 3,897,629 | A | * | 8/1975 | Liedtke | 30/30 |
| 3,906,561 | A | * | 9/1975 | Bawa | 7/107 |
| 4,149,313 | A | | 4/1979 | Ishida | |
| 4,198,751 | A | * | 4/1980 | Egbert | 30/286 |
| 4,255,856 | A | | 3/1981 | Mackie | |
| 4,729,167 | A | * | 3/1988 | De Rose | 30/2 |
| 4,974,320 | A | | 12/1990 | Pelletier | |
| 4,993,093 | A | | 2/1991 | Goldwitz | |
| 5,206,965 | A | | 5/1993 | Rowley | |
| 5,289,637 | A | | 3/1994 | Coffey | |
| D372,183 | S | | 7/1996 | Bourque | |
| 5,810,857 | A | * | 9/1998 | Mackool | 606/167 |
| D400,412 | S | * | 11/1998 | Gold | D8/20 |

(Continued)

Primary Examiner — Clark F. Dexter
(74) Attorney, Agent, or Firm — Richard C Litman

(57) ABSTRACT

The utility knife blade is a blade for a utility knife having a slot formed in the blade that is especially useful when scoring drywall. The slot may engage a tape measure adjacent the tape hook so that the cutting edge at the scoring tip of the blade extends below the tape measure hook to engage the sheet of drywall. The slot extends through the cutting edge into the body of the blade at a slight angle relative to normal, preferably about 10°. The blade has a slot at each end so that the blade may be reversed when one end is dulled or broken. The blade has an otherwise standard configuration, typically having a trapezoidal body with a cutting edge extending along the longer parallel edge and a pair of notches in the shorter parallel edge for engaging knife holder retainer pins in the slidable utility knife holder carriage.

11 Claims, 4 Drawing Sheets

(56) References Cited

U.S. PATENT DOCUMENTS

| | | | |
|---|---|---|---|
| 6,298,562 B1 | 10/2001 | Duquette | |
| 6,367,154 B2 * | 4/2002 | Degabli | 30/123 |
| 6,691,425 B1 | 2/2004 | Lee et al. | |
| 6,763,603 B2 | 7/2004 | Carrabino | |
| 6,823,593 B2 * | 11/2004 | Dunn-Rankin | 30/346.56 |
| 6,895,674 B2 | 5/2005 | Ai | |
| 6,912,799 B1 | 7/2005 | Smith | |
| 7,287,329 B2 * | 10/2007 | Cornacchio | 30/282 |
| D619,865 S * | 7/2010 | Boehler | D8/20 |
| 7,921,568 B2 * | 4/2011 | Green | 30/346.52 |
| 2001/0016988 A1 | 8/2001 | Degabli | |
| 2003/0019116 A1 * | 1/2003 | DeWall | 33/42 |
| 2004/0231171 A1 | 11/2004 | Cornacchio | |

* cited by examiner

UTILITY KNIFE BLADE

CROSS-REFERENCE TO RELATED APPLICATION

This application claims the benefit of U.S. Provisional Patent Application Ser. No. 60/924,733, filed May 30, 2007.

BACKGROUND OF THE INVENTION

1. Field of the Invention

The present invention relates to cutting tools used in building construction, and particularly to a utility knife blade for cutting drywall that is used in conjunction with a tape measure for accurately scoring drywall at a desired distance from the edge of the drywall.

2. Description of the Related Art

Drywall, also known as sheetrock or gypsum wallboard, has replaced plaster and lath as the most popular building construction material for forming the interior walls of a home, office or other architectural structure. Drywall is typically supplied in 4'×8' panels. It is often necessary to cut drywall panels to custom sizes to fit smaller or irregular openings in the wall. Drywall is typically cut by using a knife to cut a score line through the paper and into the gypsum core on one side. The main section is supported, while the overhanging cutoff section is snapped downward. The panel is reversed, and another score line is made through the paper on the opposite face of the drywall, and the cutoff section is snapped upward, if necessary, to complete the break of the gypsum core, thereby cutting the drywall.

In order to ensure that the drywall is cut to proper dimension, a T-square is a fast method used for vertical scoring 48 inches or less. Horizontal or crossboard will require other methods. Measuring and marking for a long straight edge to be placed or for a chalk line to be popped. While effective, many steps are required and considerable time will be spent. There is a need for a quicker, easier way to cut drywall.

Thus, a utility knife blade solving the aforementioned problems is desired.

SUMMARY OF THE INVENTION

The utility knife blade is a blade for a utility knife having at least one slot provided in the blade that is especially useful when scoring drywall. The slot may engage a tape measure adjacent the tape hook so that the cutting edge at the scoring tip of the blade extends below the tape measure hook to engage the sheet of drywall. The slot extends through the cutting edge into the body of the blade at a slight angle relative to normal, preferably about 10°. The blade has a slot at each end so that the blade may be reversed when one end is dulled or broken. The blade has an otherwise standard configuration, typically having a trapezoidal body with a cutting edge extending along the longer parallel edge and a pair of notches in the shorter parallel edge for engaging knife holder retainer pins in the slidable or stationary utility knife holder carriage.

In use, the end of the tape measure is extended to the desired length, the tape measure housing being held in one hand with the tape measure mark being held between the thumb and forefinger. The utility knife blade is moved against the tape measure so that the slot engages the tape measure adjacent the hook. The tip of the blade is pressed against the drywall to puncture the outer layer with the forefinger gripping the tape measure mark being held against the edge of the drywall sheet, and both hands are used to run the tape measure and the blade tip along the drywall parallel to each other, the tape measure forefinger being kept in contact with the edge of the drywall. After scoring, the drywall can then be severed in the conventional manner.

The utility knife blade can also be used with a T-square or straight edge to score drywall in the conventional manner. These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
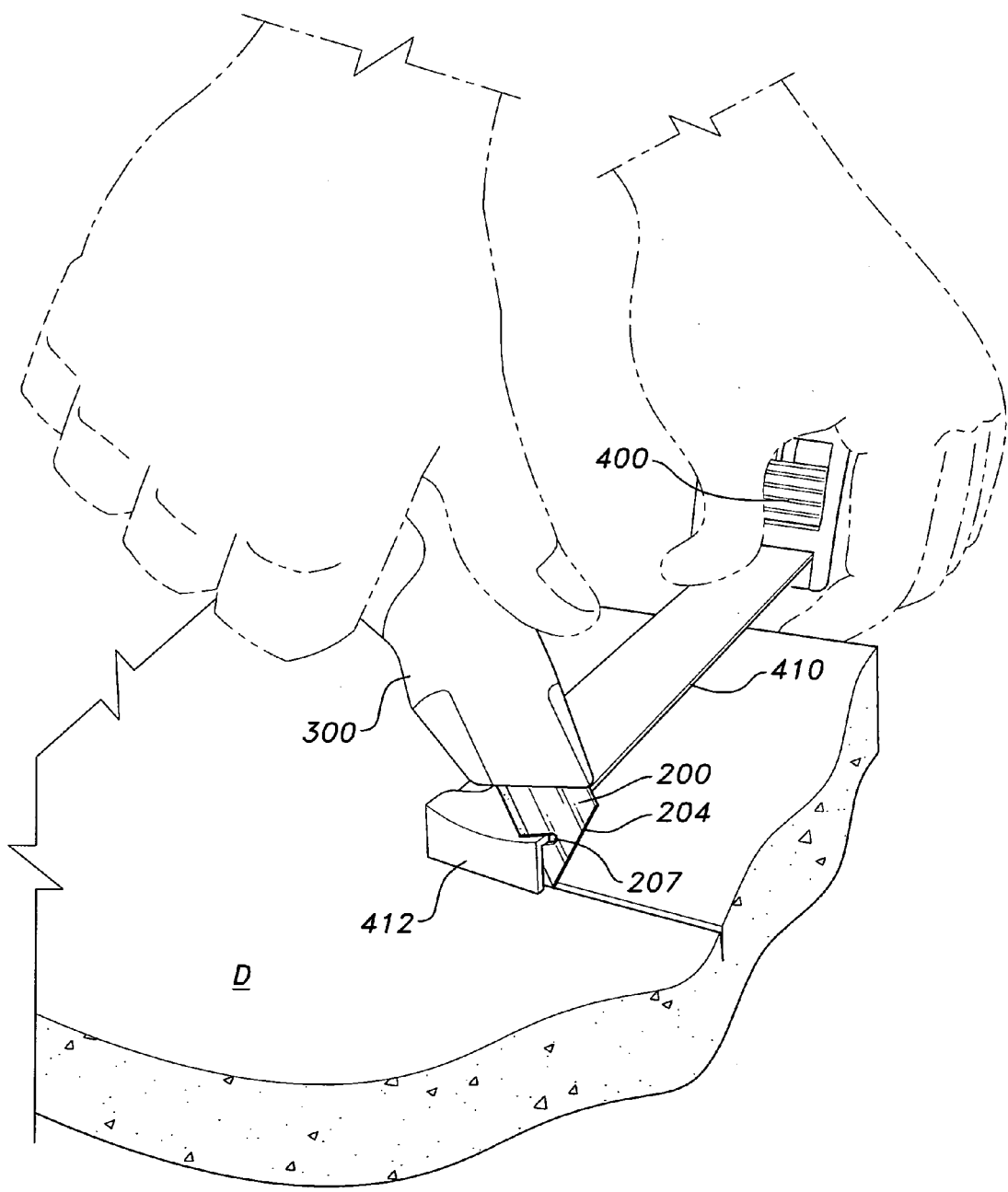
FIG. 1 is an environmental, perspective view of a utility knife blade according to the present invention.

The present invention is directed towards a utility knife blade. As will be discussed in greater detail below, the utility knife blade has a slot defined therein adjacent the tip end of the blade that provides an optional method for cutting or scoring drywall when used in combination with a tape measure. FIG. 2 shows an exemplary utility knife blade 200 according to the present invention for use with a conventional utility knife 300 (such as that shown in FIG. 1). The blade 200 includes a flat body 206 is substantially trapezoidal in shape, having a bottom cutting edge 202, a pair of notches 203 formed in the opposite top edge 201 for engaging retainer pins in the knife blade holder carriage, which is slidable or stationary in the utility knife handle, a first leading edge 204 defining a first tip end 210 and an opposing second leading edge 205 defining a second tip end 212.

A first slot 207 is defined adjacent the first leading edge 204, the slot 207 extending through the cutting edge 202 into the body 206 of the blade 200 and being angled slightly forward towards leading edge 204. An axis 214 extending longitudinally through the center of slot 207 forms an angle a of approximately 10°, in the preferred embodiment, with respect to an axis 216 extending normal to the cutting edge 202. Similarly, a second slot 208 is defined in the blade 200 that extends through cutting edge 202 adjacent the second leading edge 205 and is angled slightly forward towards second leading edge 205 approximately 10° with respect to normal (the blade 200 is preferably symmetric about a vertical, central axis 217). The blade 200 may be formed from a thin, flat sheet of steel or other suitable material.

It will be understood that, although blade 200 is shown having opposite cutting tips 210 and 212 so that the blade 200 may be reversed when one tip is broken or dull, the teaching of the present invention also extends to a utility knife blade having a single cutting tip at one end of the blade. Similarly, the blade 200 may have shapes other than trapezoidal and may have one or more holes defined therein in lieu of notches 203 for attachment to a utility knife having a different form of knife holder.

Figure 2:
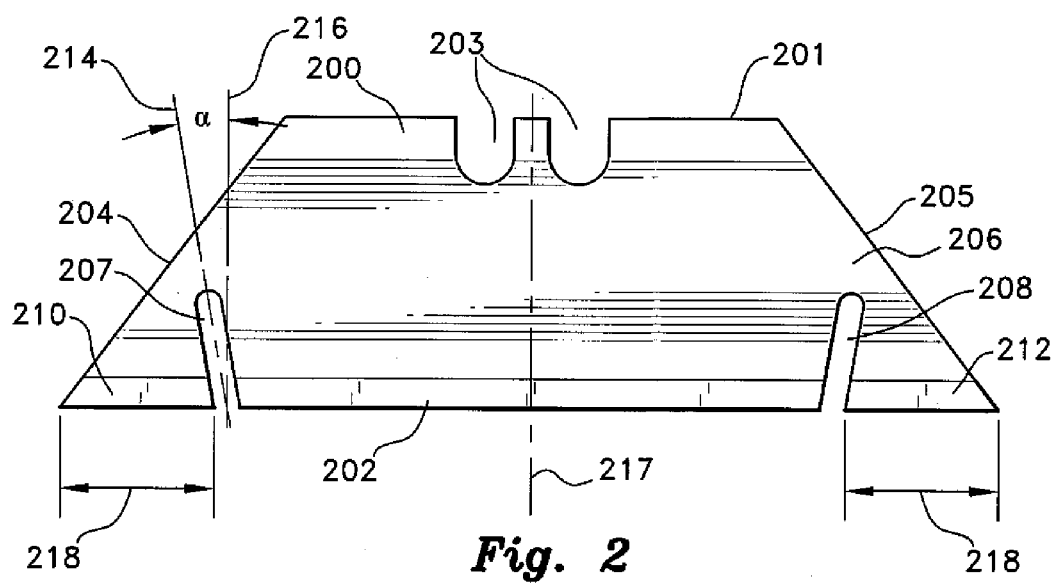
FIG. 2 is a side view of a utility knife blade according to the present invention.
Figure 3:
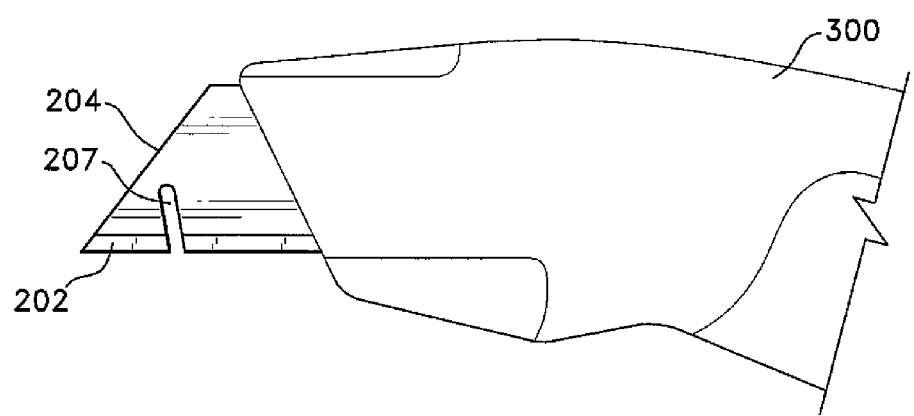
FIG. 3 is an environmental side view of a utility knife blade according to the present invention with the tip extended from the utility knife.

Referring to FIG. 1, it can be seen that the slots 207, 208 are dimensioned and configured to allow the blade 200 to engage the hook end 412 of measuring tape 410 extending out of tape measure housing 400. In addition, the orientation of the slots 207, 208 allows the face of the tape 410 to be projected upward, the slight forward angle α of the slots 207, 208 facilitating positioning the tape 410 parallel to the face of the drywall D being cut when the blade 200 is engaged and scoring the face of the drywall or sheetrock D.

The tape measure is entirely conventional, having an elongated, thin, flat strip 410 of steel or the like wound on a spring-biased reel disposed in the housing 400, the strip 410 being extendable through a slot defined in the housing 400 and having a hook 412 depending from its free end to prevent the strip 410 from winding all the way back into the housing 400, and to engage the workpiece. The hook 412 is typically short, extending between approximately ⅜" to ½" below the strip 410. At least one face of the strip 410 is ruled, having calibration marks in English or metric units. The tape measure may have a button-operated brake to lock the strip 410 in an extended position at a desired length. The width of the strip 410 is variable, depending upon the size of the tape measure.

The slots 207 and 208 have a depth sufficient to engage enough of the strip 410 that the blade 200 will engage the hook 412 to prevent the strip 410 from retracting into the housing 400, typically about one-quarter to one-half the width of the strip 410. The depth of the slots 207 and 208 is preferably approximately ⅜ inches. As shown in FIG. 2, the slots 207 and 208 are preferably recessed a distance 218, typically about one-half of an inch, which is far enough back from the tip ends 210 and 212 of the cutting edge 202 that the tip end 210 or 212 will extend below the hook 412 when the slots 207 and 208 engage the strip 410. The slots 207 and 208 are substantially linear in contour and have a width adapted to accommodate the tape measure strip 410.

It is contemplated that the blade 200 may, in some embodiments, be furnished as part of a kit with the utility knife 300 and the tape measure to ensure that the slots 207 and 208 are set far enough back from the tip end 210 or 212 of the blade 200. As noted above, the blade 200 may have a single slot, or may have a pair of slots 207 and 208, one at each end, so that the blade 200 can be reversed in the utility knife 300 when one tip 210 or 212 becomes dull or is chipped or broken.

In use, the end of the tape measure 400 is extended to the desired length, the tape measure housing being held in one hand with the tape measure mark being held between the thumb and forefinger. The utility knife blade 200 is moved against the tape measure 400 so that the slot 207 or 208 engages the tape 410 adjacent the hook 412. The tip 210 or 212 of the blade 200 is pressed against the drywall D to puncture the outer layer with the forefinger gripping the tape measure mark being held against the edge of the drywall sheet, and both hands are used to run the tape measure 400 and the blade tip 210 or 212 along the drywall D parallel to each other, the tape measure forefinger being kept in contact with the edge of the drywall D. After scoring, the drywall D can then be severed in the conventional manner. The utility knife blade 200 can also be used with a T-square or straight edge to score drywall in the conventional manner.

Figure 4:
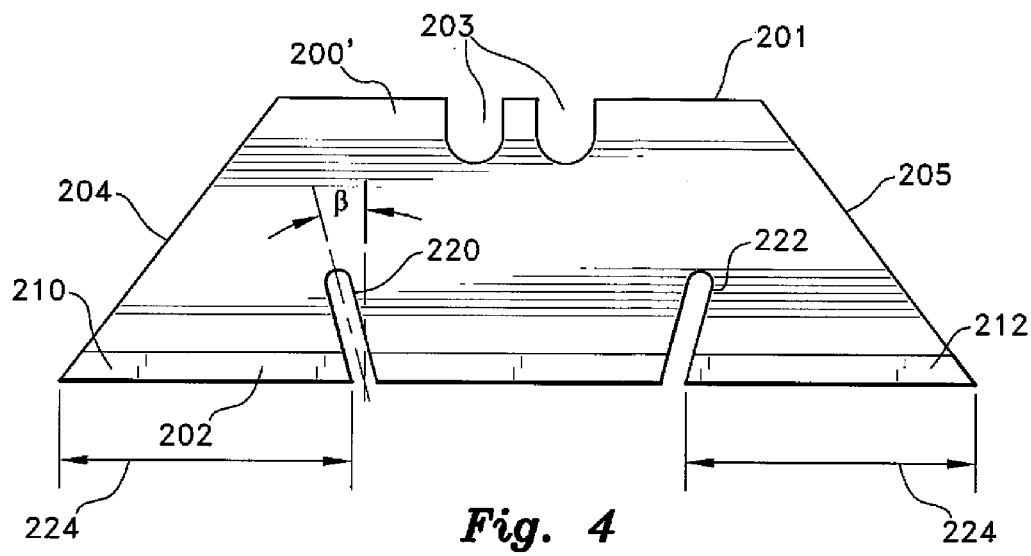
FIG. 4 is a side view of an alternative embodiment of a utility knife blade according to the present invention.

In an alternative embodiment knife blade 200' of FIG. 4, slots 207, 208 have been replaced with slots 220, 222. As shown, each of slots 220, 222 is positioned, along the lower ends thereof, a distance 224 from the respective blade tip 210, 212. Distance 224 is greater than distance 208 of FIG. 2. Compared to the exemplary dimensions given above with respect to FIG. 2, distance 224 may be approximately ⅞ of an inch. Each slot 220, 222 is also angled at an angle β with respect to the normal, which is preferably greater than angle α of FIG. 2. Angle β is preferably approximately 20°, though the angling of the slots may be between 10° and 20°. The blade 200 of FIG. 2 is designed to work with a specific type of tape measure, and for uses other than crossboard use, the slots 207, 208 may snag on the material being cut. The blade 200' shown in FIG. 4, with slots 220, 222 is designed to work with a wide variety of tape measures and provides a greater usable blade surface (along the greater length 224 of blade 200') for other uses. The possibility of snagging is also reduced by this alternative slot placement.

Figure 5:
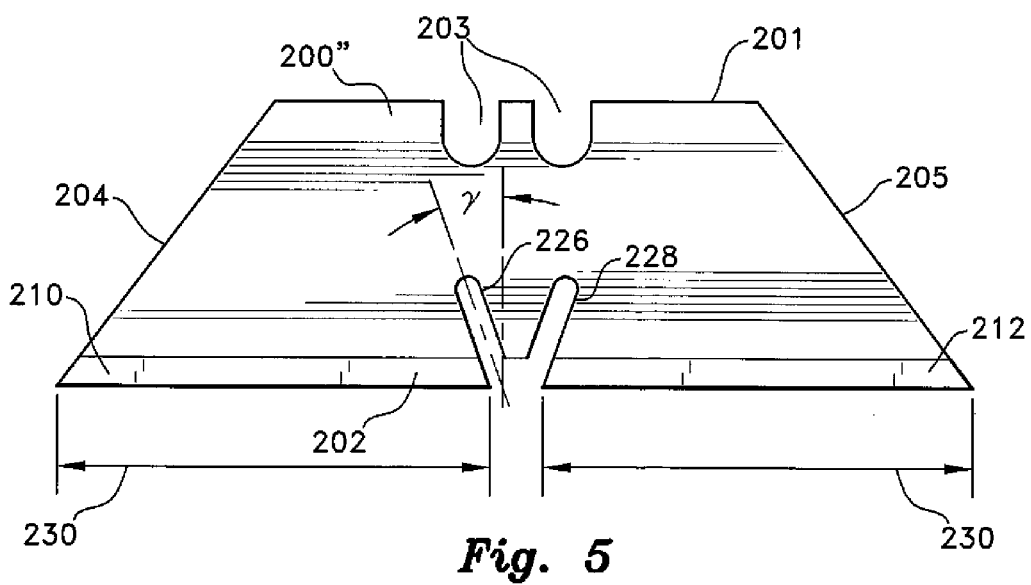
FIG. 5 is a side view of another alternative embodiment of a utility knife blade according to the present invention.
Figure 6A:
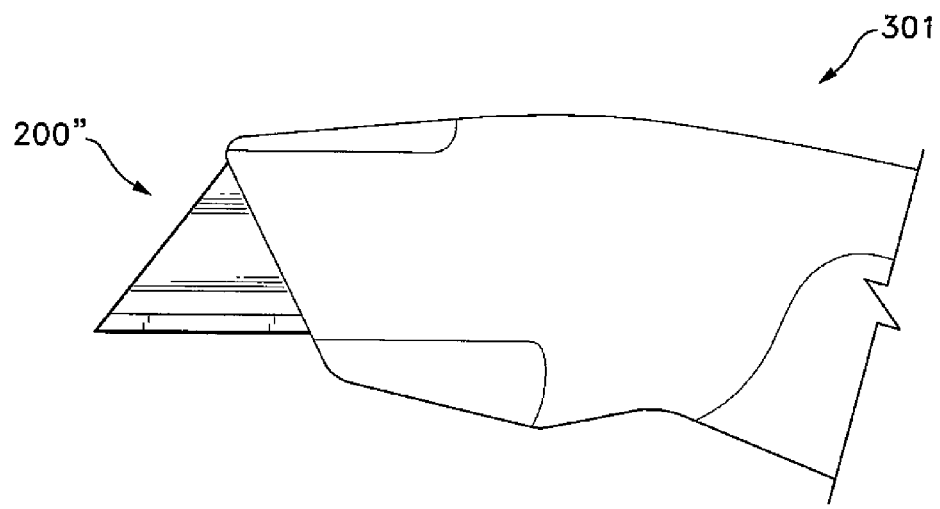
FIG. 6A is a side view of a utility knife incorporating the utility knife blade of FIG. 5.
Figure 6B:
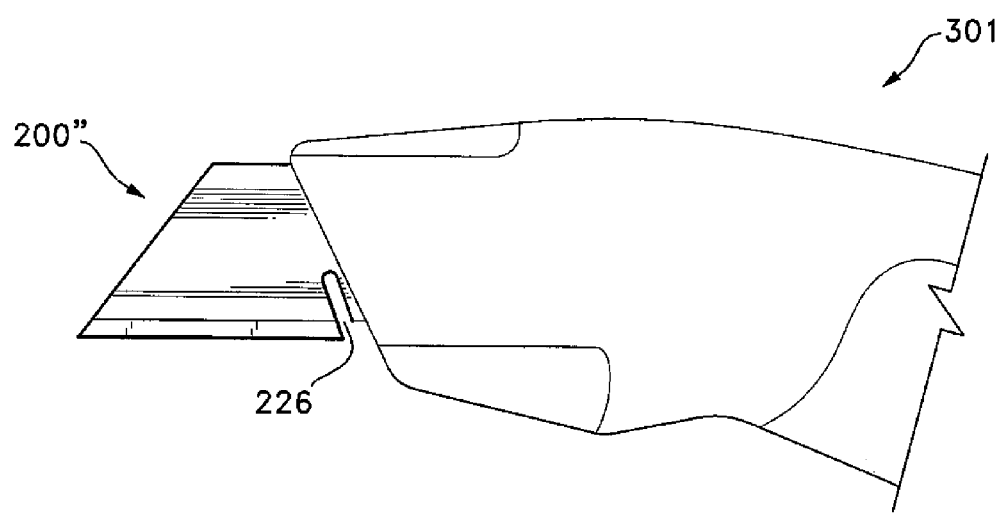
FIG. 6B is a side view of the utility knife and utility knife blade of FIG. 6A with the utility knife blade shown in a fully extended position.

Similarly, in another alternative embodiment knife blade 200'' of FIG. 5, slots 207, 208 have been replaced with slots 226, 228. As shown, each of slots 226, 228 is positioned, along the lower edge thereof, a distance 230 from the respective blade tip 210, 212. Distance 230 is greater than distance 208 of FIG. 2 or distance 224 of FIG. 4. Compared to the exemplary dimensions given above with respect to FIG. 2, distance 224 may be approximately one inch. Each slot 220, 222 is also angled at an angle γ with respect to the normal, which may be approximately equal to angle β of FIG. 4; i.e., angle γ is preferably approximately 20°, though the angling of the slots may be between 10° and 20°. The blade 200'' of FIG. 5 is designed to work with a stationary utility knife and provides more of a usable blade surface (along the lengths 230) than those shown in FIG. 2 or FIG. 4. Preferably, the blade 200' shown in FIG. 4 is used with a specialized utility knife 301 that holds the blade 200' so that the slot(s) 220, 222 are held within the body of the knife 200' until needed, thus removing the possibility of snagging during usage. In FIGS. 6A and 6B, the blade 200'' of FIG. 5 is shown in such a specialized utility knife 301. In the first position of the blade 200'' shown in FIG. 6A, the utility knife 301 may be used in a conventional manner. In the position of blade 200'' shown in FIG. 6B, which is extended to expose slot 226, the blade 200'' may now be used in the manner described above, in combination with a measuring tape.

It is to be understood that the present invention is not limited to the embodiment described above, but encompasses any and all embodiments within the scope of the following claims.

I claim:
1. A utility knife blade, comprising:
a flat body having a cutting edge, the body having a central axis normal to the cutting edge and the body being adapted for mounting in a utility knife, the body having a forward tip end and a rearward tip end, the cutting edge extending substantially linearly from the forward tip end to the rearward tip end and interrupted by at least one slot extending through the cutting edge partially into the body, wherein the at least one slot has substantially no cutting edge, a first slot of the at least one slot defining a slot length and being located between the central axis and one of the forward tip end or the rearward tip end, the first slot being on the same lateral side of the central axis as the one tip end so that the first slot is adapted for engaging a retractable tape measure strip adjacent a hook end of the retractable tape measure strip with the one tip end extending below the hook end in order to score a sheet of drywall a measured distance from an edge of the drywall, wherein the cutting edge extends from a pointed end at the one tip end continuously to the first slot and continues from the first slot towards the other tip end, the slot length of the first slot extending away from the cutting edge and away from the central axis towards the one tip end at an angle relative to the central axis.

2. The utility knife blade as recited in claim 1, wherein the forward and rearward tip ends are formed symmetrically with respect to one another about the central axis.

3. The utility knife blade as recited in claim 2, wherein the at least one slot includes a second slot.

4. The utility knife blade as recited in claim 3, wherein the first and second slots are formed symmetrically with respect to one another about the central axis, and wherein the cutting edge extends from a pointed end at the other tip end continuously to the second slot and continues from the second slot towards the one tip end.

5. The utility knife blade as recited in claim 4, wherein each said slot is angled between approximately 10° and 20° relative to normal to the cutting edge.

6. The utility knife blade as recited in claim 1 in combination with:

a tape measure having a housing and a retractable calibrated strip extendable from the housing, the calibrated strip having a hook end: and a utility knife having the blade mounted in the knife.

7. The utility knife blade as recited in claim 6, wherein the forward and rearward tip ends are formed symmetrically with respect to one another about the central axis.

8. The utility knife blade as recited in claim 7, wherein the least one slot includes a second slot.

9. The utility knife blade as recited in claim 8, wherein the first and second slots are formed symmetrically with respect to one another about the central axis, and wherein the cutting edge extends from a pointed end at the other tip end continuously to the second slot and continues from the second slot towards the one tip end.

10. The utility knife blade as recited in claim 9, wherein each said slot is angled between approximately 10° and 20° relative to normal to the cutting edge.

11. The utility knife blade as recited in claim 1, wherein the at least one slot has elongated parallel side walls along the length thereof and converge towards each other to form the terminal end of the slot.

* * * * *